March 23, 1948. H. J. CALLAHAN 2,438,331
SHIP'S TELEGRAPH RECORDER
Filed May 10, 1945 2 Sheets-Sheet 2
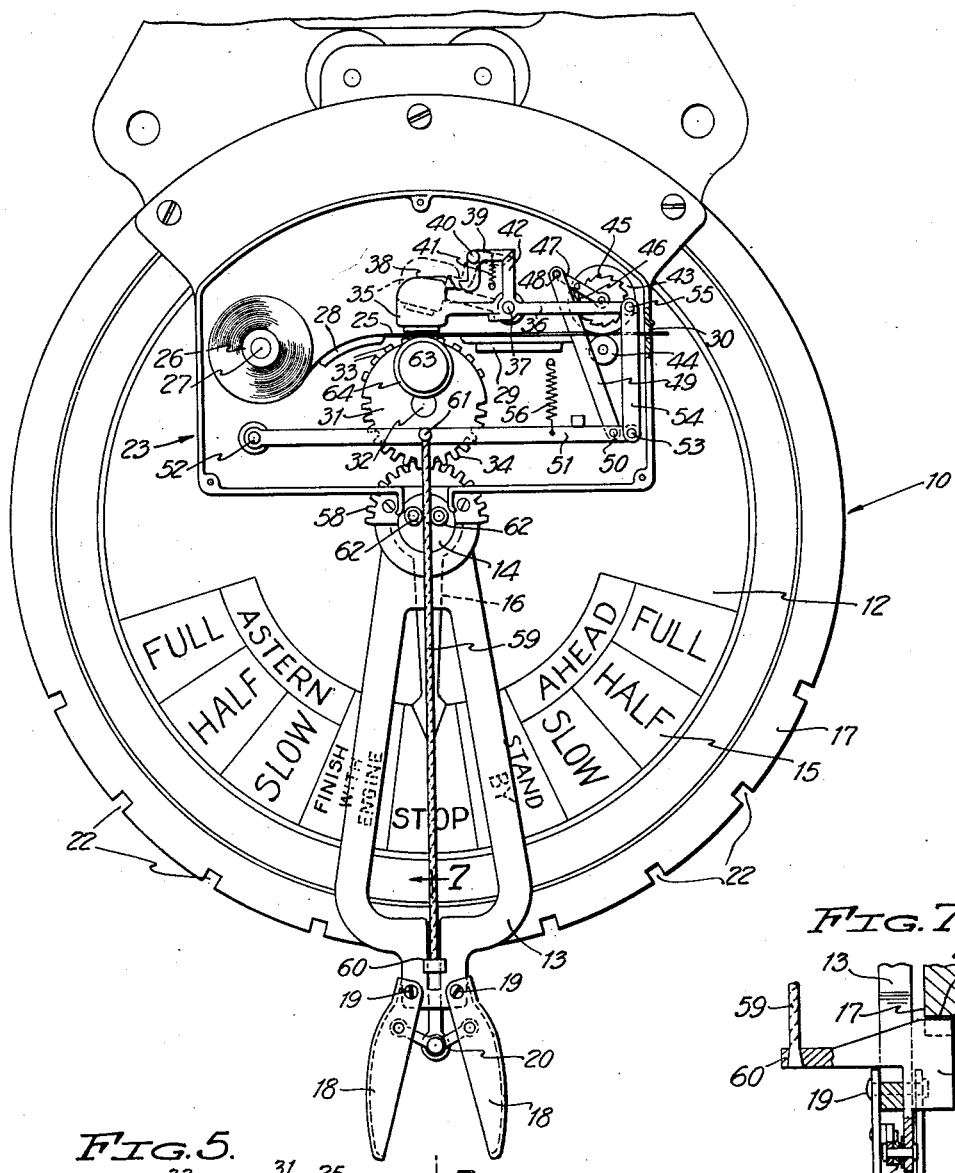
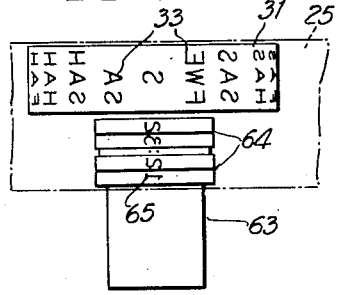
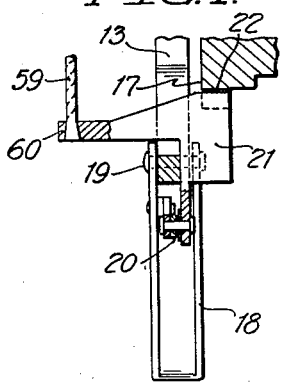
INVENTOR
HUGH J. CALLAHAN
BY
ATTORNEYS Patented Mar. 23, 1948

2,438,331

UNITED STATES PATENT OFFICE 2,438,331

SHIP'S TELEGRAPH RECORDER

Hugh J. Callahan, Wilmington, Del.

Application May 10, 1945, Serial No. 592,942

4 Claims. (Cl. 234—27)

This invention relates to improvements in a ship's telegraph system in general use on ships in the naval and mercantile service.

More particularly, the invention relates to improvements in a ship's telegraph recorder designed and adapted to record the signals and the time thereof as transmitted and received between the navigating bridge and the engine room of the vessel, and wherein such record is printed on paper tape to be subsequently removed from the instrument and pasted in the official ship's record for future reference in connection with any accident or dispute during the maneuvers of the ship, in order to fix responsibility, and to prevent recurrence of such accidents and disputes.

The principal object of the invention is to provide improvements in a recorder of the indicated character whereby to attain simplicity in construction, reliability in operation, and low cost of manufacture.

A further object of the invention is the provision of a recorder of the indicated type which is applicable as a unit to a standard type of bridge telegraph and an engine room telegraph.

With the foregoing and other objects in view, the invention resides in the combination, arrangement and operation of the parts hereinafter described, and illustrated in the accompanying drawings, in which, Figure 1 is a front elevational view of a ship's engine room telegraph selected to illustrate the recorder of the present invention shown applied thereto.

Figure 2 is a side elevational view.

Figure 3 is a top view, the casing of the recorder being shown in section to show certain parts of the recorder.

Figure 4 is a sectional view taken on the line 4—4 of Figure 3, and looking in the direction indicated by the arrows.

Figure 5 is a fragmentary view looking down on the signal and time type disks showing their relation to each other.

Figure 6 is a view of a portion of the printed paper tape.

Figure 7 is an enlarged sectional view taken on the line 7—7 of Figure 4.

Figure 1:
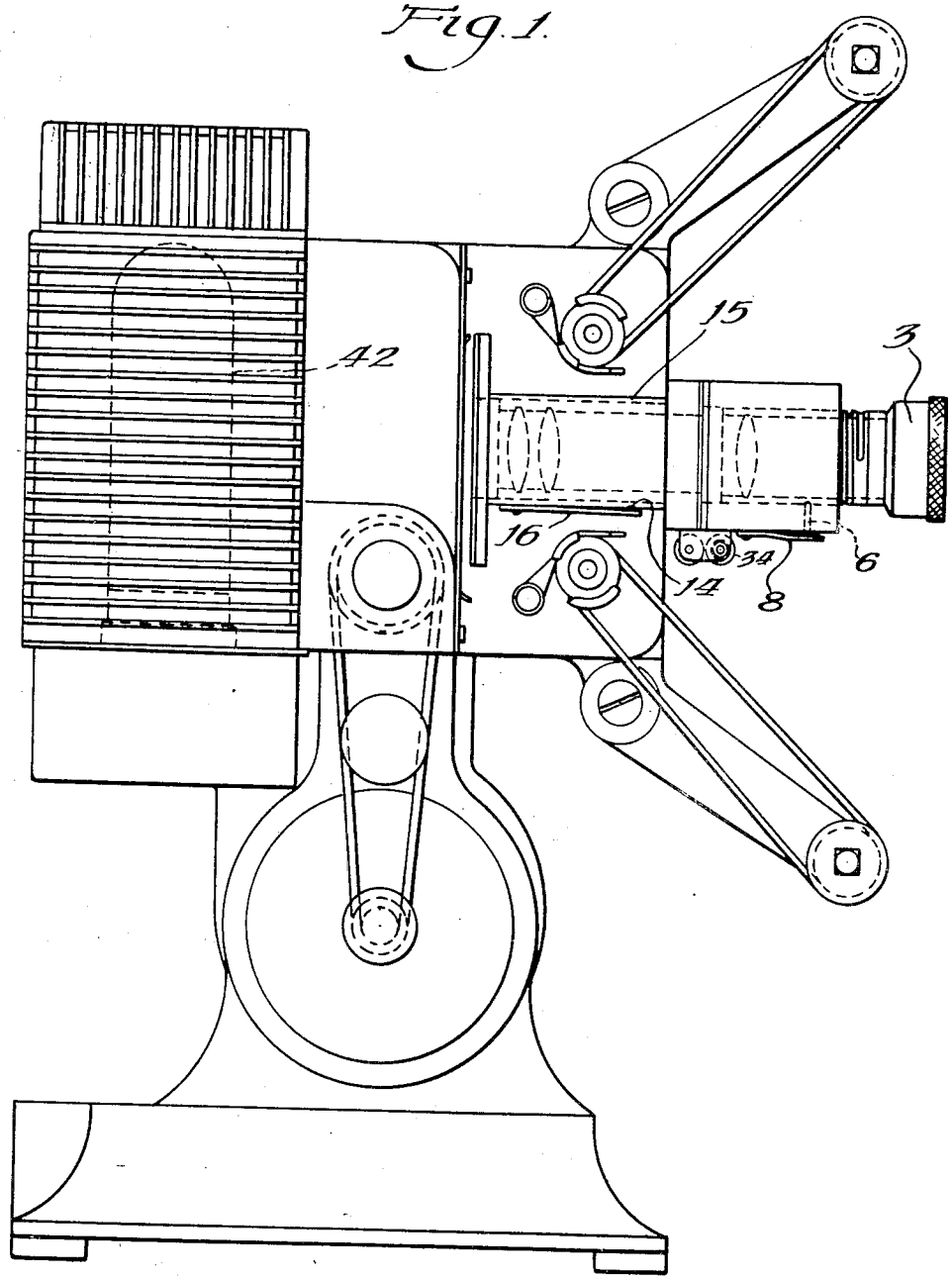

Referring now more particularly to the drawings, it will be seen that there is shown a ship's engine room telegraph 10 including a casing 11 within which is arranged a dial 12. A handle 13 has its inner end secured to an arbor 14. The upper face of the dial 12 is subdivided radially and within the subdivisions are imprinted different signals or orders 15, namely, "Full ahead," "Half ahead," "Slow ahead," "Stand by," "Stop," "Finished with engine," "Slow astern," "Half astern," and "Full astern." These orders are transmitted from a bridge telegraph in the operation of a ship's signal system to the engine room for acknowledgment by the engineer during the maneuvering of the ship in docking or getting under way.

The handle 13 on the arbor 14 serves as a lever having pivotal movement with the arbor as a fulcrum. The handle 13 is disposed above the dial 12 for movement with respect thereto. A pointer 16 is movable with respect to the orders 15 to indicate any selected order upon movement of the handle of the bridge telegraph. The selected order 15 is framed in an opening in the handle 13.

The outer end of the handle 13 projects beyond a rim or flange 17 on the casing 11. Cooperative hand grips 18 are pivotally connected with the outer end of the handle, as at 19. A toggle 20 connected with the grips 18 is also connected with a detent 21 engageable in and disengageable from any one of a plurality of notches 22 in the flange 17. The notches 22 are equal in number to the number of orders 15, and are spaced accordingly, so that the handle 13 is held by the detent 21 in registry with the selected order 15. As shown in Figures 1 and 4 the handle is held at its midway position in registry with the order "Stop."

The recorder 23 includes a casing 24 secured to the telegraph casing 11 over the dial 12 and opposite the series of orders 15.

A strip 25 of paper about two inches in width is wound on a spool 26 mounted for rotation on a shaft 27 supported on the back wall of the casing 24. The spool 26, with its wound strip 25, is located within the casing 24 at one side thereof. The strip 25 has guided movement on spaced guides 28 and 29 respectively supported by the side walls of the casing 24. The guide 28 is rounded, whereas the guide 29 is flat and disposed in line with a slot 30 in the adjacent end wall of the casing 24. The long edges of the slot 30 serve as cutters for severing a printed portion of the strip 25.

The recorder includes a printing drum 31 having rotational movement on a shaft 32 supported on the back wall of the casing 24 at a point midway of the space between the guides 28 and 29 below the same. The drum has arranged on approximately one half the circumferential surface thereof abbreviations in type 33 corresponding to and denoting the aforesaid orders 15. The abbreviations in raised type are FAH, said detent being disposed to be brought into registry with any one of said notches upon the pivotal movement of the handle into an appropriate set position, by manipulating said hand grips, said detent being engageable in said notch when the hand grips are released, to hold the handle in the set position, and said detent being disengaged to enable the movement of the handle when the hand grips are manipulated towards each other.

4. A ship's telegraph recorder including means to support a strip of material to receive print, a guide on which the strip may move, printing means, strip moving means which cooperates with said guide to move the strip a predetermined degree, said printing means including a printing drum having rotational movement and a hammer having pivotal movement to cooperate with said printing drum to imprint a record on said strip, a handle having pivotal movement, means operated by the pivotal movement of the handle to cause the rotational movement of the printing drum into a selected printing position, pivoted cooperative hand grips on said handle, a toggle connected with said hand grips between the same, a flexible cable, a lever, the opposite ends of said cable being connected with said toggle and lever respectively, to move the lever downwardly when the hand grips are manipulated towards each other, resilient means to cause the upward return movement of the lever upon the release of the hand grips, means on the lever to actuate the strip moving means when the lever moves downwardly, and means operated by the lever to actuate the hammer when the lever moves upwardly.

HUGH J. CALLAHAN.

REFERENCES CITED

The following references are of record in the file of this patent:

UNITED STATES PATENTS

| Number | Name | Date |
| --- | --- | --- |
| 1,008,457 | Fish | Nov. 14, 1911 |
| 1,345,626 | O'Neil | July 6, 1920 |
| 1,787,066 | Carter et al. | Dec. 30, 1930 |

March 23, 1948.  J. E. DICKMAN  2,438,333
MOTION PICTURE PROJECTOR ADAPTER FOR SHOWING STILL PICTURES
Filed Aug. 20, 1945  2 Sheets-Sheet 1

Inventor:
Joseph E. Dickman
By Chritton, Wiles, Schroder,
Merriam & Hofgren
Attorneys